United States Patent [19]

Janowicz

[11] Patent Number: 4,746,713

[45] Date of Patent: May 24, 1988

[54] BIMETALLIC CATALYTIC CHAIN TRANSFER AGENTS FOR MOLECULAR WEIGHT CONTROL IN FREE RADICAL POLYMERIZATION

[75] Inventor: Andrew H. Janowicz, Wilmington, Del.

[73] Assignee: E. I. Du Pont de Nemours and Company, Wilmington, Del.

[21] Appl. No.: 916,926

[22] Filed: Oct. 14, 1986

Related U.S. Application Data

[63] Continuation-in-part of Ser. No. 797,476, Nov. 13, 1985, abandoned.

[51] Int. Cl.$^4$ ............................................. C08F 2/40
[52] U.S. Cl. .................................... 526/170; 526/113; 526/117; 526/126; 526/147; 526/171; 526/329.7; 526/346
[58] Field of Search ............... 526/126, 135, 147, 170, 526/171, 113, 117

[56] References Cited

U.S. PATENT DOCUMENTS

| | | | |
|---|---|---|---|
| 2,160,934 | 6/1939 | Wiley | 260/80 |
| 3,051,693 | 8/1962 | Leto | 526/135 |
| 3,846,383 | 11/1974 | Uyama et al. | 526/172 |
| 4,526,945 | 7/1985 | Carlson et al. | 526/145 |

FOREIGN PATENT DOCUMENTS 1033161 6/1966 United Kingdom.

OTHER PUBLICATIONS

Enikolopyan et al., J. Poly. Sci., Polymer. Chem. Ed., 19:879–889 (1981).
Smirnov et al., Polymer Science, U.S.S.R. 23:3807–2816 (1981).
Pashchenko et al., Doklady Akademii Nauk SSR, 265(4):889–892 (1982).
Takahashi et al., Bull. Chem. Soc. Jap., 36:622–623 (1963).

Primary Examiner—Edward J. Smith

[57] ABSTRACT

A process for controlling the molecular weight of polymer and copolymer in radical initiated polymerization with a bimetallic catalytic chain transfer agent is disclosed.

12 Claims, No Drawings

BIMETALLIC CATALYTIC CHAIN TRANSFER AGENTS FOR MOLECULAR WEIGHT CONTROL IN FREE RADICAL POLYMERIZATION

CROSS-REFERENCE TO RELATED APPLICATIONS

This application is a continuation-in-part of commonly-assigned U.S. Ser. No 797,476 filed on Nov. 13, 1985, now abandoned.

BACKGROUND OF THE INVENTION

1. Field of the Invention

This invention relates to free radical polymerization processes employing chain transfer agents for controlling the molecular weight of polymer and copolymer product.

2. Background Art

Techniques for controlling the molecular weight of polymer and copolymer with chain transfer agents are currently being developed. Problems associated with use of known chain transfer agents include undesirable odor, intense color, and broad molecular weight distribution in the resulting polymer. Improved chain transfer agents are of considerable interest to the chemical industry.

U.S. Pat. No. 2,160,934, issued to Wiley, discloses that the combination of an active oxygenating agent with a metal carbonyl constitutes an active catalyst for accelerating the polymerization rate of vinylidine halides and mixtures thereof with other polymerizable materials at room temperature. U.K. Pat. No. 1,033,161 discloses a process for the polymerization of a vinyl compound comprising contacting the vinyl compound with a transition metal carbonyl and an activator containing covalently bound halogen.

Enikolopyan et al., *J. Poly. Sci., Polymer. Chem. Ed.*, 19: 879–889 (1981) disclose use of a cobalt complex of hematoporphyrin tetramethyl ether as catalysts for chain transfer to monomer. Each porphyrin molecule is said to cause not less than 2000 transfer reactions. Smirnov et al., *Polymer Science, USSR*, 23: 2807–2816 (1981) disclose the use of cobalt-porphyrin complexes as catalytic chain transfer agents for controlling molecular weight in the radical polymerization of styrene. Pashchenko et al., *Doklady Akademii Nauk SSSR*, 265(4): 889–892 (1982) disclose the use of a cobalt complex of etioporphyrin-I as a catalytic chain transfer agent for radical polymerization of methyl methacrylate. It has been found that one disadvantage of cobalt-porphyrin complexes is an intense color in resulting polymer.

U.S. Pat. No. 4,526,945, issued to Carlson and Abbey, disclose a process for the preparation of low molecular weight methacrylate polymers and copolymers. Methacrylate monomers and lower amounts of other ethylenically unsaturated monomers are polymerized in the presence of an azo or similar free radical catalyst in conjunction with between about 0.0001% and 0.01% by weight dimethylglyoxime pyridine complex of cobalt-(II). The resulting polymer exhibits controlled low molecular weight on the order of 500–20,000 as compared to about 100,000 in the absence of the cobalt(II) complex.

Takahashi et al., *Bull. Chem. Soc. Jap.*, 36: 622–623 (1963) disclose the use of cobalt cyanide complex in the presence of hydrogen as an initiator for the polymerization fo methyl methacrylate, styrene, acrylonitrile, and butadiene.

SUMMARY OF THE INVENTION

The present invention provides a process for free radical polymerization of unsaturated monomer wherein molecular weight control is effected by means of a catalytic chain transfer agent. The process comprises contacting unsaturated monomer selected from the group consisting of methacrylate, acrylate, and styrene with a catalytically effective amount of a free radical initiator in the presence of a bimetallic catalytic chain transfer agent. The bimetallic catalytic chain transfer agent has the formula

wherein, for each occurrence,
A is an unsubstituted cyclopentadienyl anion or a cyclopentadienyl anion substituted with at least one substituent selected from the group consisting of $C_6H_5$, $C_yH_{2y+1}$, $SiR_3$, $PR_2$, and $CO_2R$;
L is CO, $(C_6H_5)_3P$, $(C_6H_5O)_3P$, $R_3P$, $(RO)_3P$;
M is Cr, Mo, W, Fe, Ru, Os;
R is $C_yH_{2y+1}$;
x is 3 when m is Cr, Mo, or W; and 2 when m is Fe, Ru, or Os; and
y is an integer from 1 to 12, inclusive. Preferably, the bimetallic catalytic chain transfer agent is present in a concentration of from about $1.0 \times 10^{-7}$ to about $1.0 \times 10^{-2}$M.

DETAILED DESCRIPTION OF THE INVENTION

This invention provides a process for free radical polymerization of unsaturated monomer wherein molecular weight control is effected by means of a bimetallic catalytic chain transfer agent. In addition to molecular weight control, the present process can be used to narrow molecular weight distribution in the resulting polymer. Control of molecular weight and the distribution thereof permits one to produce polymer or copolymer with useful physical properties, such as glass transition temperature, hardness, heat distortion temperature, and viscosity. For example, the present process can be used to produce low molecular weight polymer or copolymer with low viscosity and very little color which is useful for paints and finishes.

Polymer or copolymer produced by the present process contains unsaturated end groups. Such polymer or copolymer is referred to herein as "macromonomer". It has been found that macromonomer prepared in accordance with the present invention can be polymerized or copolymerized to form polymer or copolymer with desirable physical properties, such as high tensile strength, low viscosity, improved crystallinity and clarity. Macromonomers having from about 10 to about 1,000 units are preferred for paints and finishes, and most preferably, from about 100 to about 500 units.

In the process of the present invention, bimetallic complexes are used as catalytic chain transfer agents for molecular weight control in free radical polymerization of unsaturated monomer selected from the group consisting of methacrylate, acrylate, and styrene. The polymerization is conducted by contacting the unsaturated monomer with a catalytically effective amount of a free radical initiator in the presence of a bimetallic catalytic chain transfer agent. Suitable catalytic chain transfer agents have the formula, $$A(L)_xM-M(L)_xA$$

wherein for each occurrence A, L, x and M are as previously defined. Preferably, A is an unsubstituted cyclopentadienyl anion, L is CO, and M is Cr. These catalytic chain transfer agents can be prepared by methods known in the art from precursors disclosed in the following references. Piper and Wilkinson, *J. Inorg. Nucl. Chem.*, 3: 104-124 (1956) disclose the preparation of CpM(CO)$_3$H where M is Cr, Mo and W. Fischer and Pruett, *Inorg. Syn.*, 7: 136-139 (1963) disclose the preparation of CpM(CO)$_3$H where M is Cr, Mo and W. Birdwhistle et al., *J. Organomet. Chem.*, 157: 239 (1978) disclose preparation of [CpM(CO)$_3$]$_2$ complexes where M is Cr, Mo, and W. Humphries and Knox, *J. C. S. Dalton Transactions*, 16/17: 1710 (1975) disclose preparation of [CpRu(CO)$_2$]$_2$. Hoyano et al., *Inorg. Chem.*, 21: 3095 (1982) disclose preparation of CpOs(CO)$_2$H and C$_5$(CH$_3$)$_5$Os(CO)$_2$H which can be converted by techniques known in the art to the dimeric compounds used in the examples. Madach and Vahrenkamp, *Chem. Ber.*, 113: 2675 (1980) disclose preparation of Cp(CO)$_3$CrMo(CO)$_3$Cp. Hackett et al., *J. C. S. Dalton*, 15: 1625 (1974) disclose preparation of [CpCr(CO)$_2$PPh$_3$]$_2$. The disclosures of these references are incorporated herein by reference. Preferably the bimetallic catalytic chain transfer agent is present in an amount of from about $1 \times 10^{-7}$ to about $1.0 \times 10^{-2}$M, and most preferably from about $2 \times 10^{-6}$ to about $1 \times 10^{-3}$M.

In free radical polymerizations, the molecular weight of the polymer product will depend on several factors, including:

1. the monomer/initiator molar ratio (M/I);
2. the boiling point of the reaction medium;
3. the inherent chain transfer activity of the solvent; and
4. the relative rates of initiation and propagation.

In the present invention, other factors, such as the relative activity of the chain transfer agent and the chain transfer agent/initiator molar ratio are also important. It has been found that the concentration of the bimetallic catalytic chain transfer agent determines the molecular weight of the resulting polymer or copolymer.

In the present invention unsaturated monomer selected from the group consisting of methacrylate, acrylate, and styrene are polymerized or copolymerized. Suitable methacrylate acrylate and styrene monomers are generically described by the following formulae, respectively:

$$CH_2=\overset{CH_3}{\underset{|}{C}}-X, \ CH_2=CH-Y, \text{ and } C_6H_5CH=CH_2,$$

wherein X is COOR or CN, Y is COOR or CN, and R is a moiety not interfering with the catalytic chain transfer activity of the bimetallic catalytic chain tranfer agent. Preferably, R is at least one moiety selected from the group consisting of C$_6$H$_5$, allyl, glycidal, hydroxyalkyl, allyloxyethyl, 2,4-hexadienyl, dialkyl aminoalkyl, and C$_z$H$_{2z+1}$, where z is an integer from 1 to 12, inclusive. The process of the present invention is conducted in a solvent which is compatible with and capable of dissolving the selected monomer, initiator, and bimetallic catalytic chain transfer agent. A partial list of suitable solvents includes aromatic hydrocarbons like benzene, toluene, and xylene; ethers like tetrahydrofuran and diethyl ether; ketones like acetone, butanone, pentanone, and hexanone; and alcohols like methanol, ethanol, propanol, and butanol. Preferably the solvent has a boiling point of from about 35° to about 145° C. Most preferably, the solvent is methyl ethyl ketone. In some instances, it may be advantageous in use mixtures of two or more solvents.

In the present process unsaturated monomer is contacted with a catalytically effective amount of a free radical initiator in the presence of a bimetallic catalytic chain transfer agent. Preferably, the contacting is conducted at a temperature of from about 35° to about 145° C., and most preferably at the reflux temperature of the solvent. Suitable free radical initiators are capable of initiating the polymerization of selected unsaturated monomer. Any of the known class of azo polymerization initiators is suitable provided it has requisite solubility in the solvent or monomer mixture chosen and has an appropriate half-life at the temperature of polymerization. Preferably, the initiator is an azo compound selected from the group consisting of azodiisobutyronitrile, dimethylazodiisobutyrate, and 2,2'-azobis-[2-methyl]butane-nitrile, most preferably 2,2'-azobis[2-methyl]butane-nitrile.

The process of the invention generally is carried out in batch mode in accordance with techniques which are well known to one skilled in the art. Such techniques are demonstrated in the Examples. Batch polymerization can be conducted by charging selected monomer, solvent, chain transfer agent and initiator to a nitrogen flushed reactor and heating under a nitrogen flow. Preferably, the catalytic chain transfer agent/initiator molar ratio is in the range of from about 0.004 to about 2. Preferably, polymerization is conducted in the absence of molecular oxygen under an inert atmosphere such as nitrogen, argon or other non-oxidizing gas.

Upon completion of polymerization the polymer is isolated by stripping off solvent and unreacted monomer or by precipitation with a nonsolvent. Alternatively, the polymer solution can be used as such if appropriate to its application.

The invention is further described by the following Examples, wherein all parts and percentages are by weight and degrees are Celcius. In the Examples number average molecular weight (Mn), weight average molecular weight (Mw), and peak fraction molecular weight (peak Mw) were determined by gel permeation chromatography.

EXAMPLES 1-3 AND COMPARATIVE EXPERIMENT A

Bis[Tricarbonyl($\eta$-Cyclopentadienyl)Molybdenum] as Catalytic Chain Transfer Agent in Free Radical Polymerization of Methyl Methacrylate Methyl methacrylate was sparged with nitrogen and passed through a column of alumina (grade 1). 10.72 mL (0.1 mole) of the resulting methyl methacrylate and the amount of bis[tricarbonyl($\eta$-cyclopentadienyl)molybdenum] catalyst shown in Table I as catalytic chain transfer agent were added to a 100 mL volumetric flask in a nitrogen dry box. The volume in the flask was brought to 100 mL with methyl ethyl ketone. The resulting combination and 0.082 g ($5.0 \times 10^{-4}$ mole) of 2,2'-azobis(isobutyronitrile) initiator were added to a 300 mL round bottom flask. The resulting mixture was stirred to dissolve the initiator and a 1 mL sample of the mixture was removed for gas liquid phase chromatography (glpc) analysis. The round bottom flask was capped with a water cooled condenser and removed from the nitrogen dry box. The mixture was heated at reflux under a nitrogen atmosphere for 6 hours and cooled to ambient temperature. A 1 mL sample of the resulting mixture was removed for glpc analysis. Precipitated polymer was collected by filtration and weighed. The results are shown in Table I. The percent reaction shown in Table I was determined based on glpc analysis of the 1 mL sample removed before and after heating at reflux.

TABLE 1

| Ex. | Comp. Exp. | [(C$_5$H$_5$Mo(CO)$_3$)$_2$] | Mn | Mw | Mw/Mn | Reaction | Yield |
|---|---|---|---|---|---|---|---|
| | A | 0 | 11,400 | 23,700 | 2.08 | | |
| 1 | | 4 × 10$^{-5}$ M | 6,990 | 16,600 | 2.38 | 58% | 5.10 g. |
| 2 | | 2 × 10$^{-4}$ M | 5,690 | 9,490 | 1.67 | 35% | 2.66 g. |
| 3 | | 1 × 10$^{-3}$ M | 3,980 | 7,520 | 1.89 | 29% | 2.20 g. |

EXAMPLES 4–6

Bis[Dicarbonyl($\eta$-Cyclopentadienyl)Iron] as Catalytic Chain Transfer Agent in Free Radical Polymerization of Methyl Methacrylate 10.72 mL (0.1 mole) of methyl methacrylate were polymerized according to a method similar to that described in Example 1, except the amounts of bis[dicarbonyl($\eta$-cyclopentadienyl)iron shown in Table II were used as the catalytic chain transfer agent. The results are shown in Table II.

TABLE II

| Ex. | [C$_5$H$_5$Fe(CO)$_2$)$_2$] | Mn | Mw | Mw/Mn | Reaction | Yield |
|---|---|---|---|---|---|---|
| 4 | 4 × 10$^{-5}$ M | 6,480 | 14,500 | 2.24 | 58% | 3.80 g |
| 5 | 2 × 10$^{-4}$ M | 5,820 | 10,300 | 1.77 | 38% | 3.45 g |
| 6 | 1 × 10$^{-3}$ M | 3,490 | 6,970 | 2.00 | 24% | 2.30 g |

EXAMPLES 7 AND 8

Bis[Tricarbonyl($\eta$-Cyclopentadienyl)Chromium] as Catalytic Chain Transfer Agent in Free Radical Polymerization of Methyl Methacrylate 10.72 mL (0.1 mole) of methyl methacrylate were polymerized according to a method similar to that described in Example 1, except the amounts of bis[tricarbonyl($\eta$-cyclopentadienyl)chromium] shown in Table III were used as the catalytic chain transfer agent. The results are shown in Table III.

TABLE III

| Ex. | [(C$_5$H$_5$Cr(CO)$_3$)$_2$] | Mn | Mw | Mw/Mn | Reaction | Yield |
|---|---|---|---|---|---|---|
| 7 | 2 × 10$^{-6}$ M | 11,900 | 21,400 | 1.80 | 66% | 6.90 g. |
| 9 | 8 × 10$^{-6}$ M | 5,160 | 16,700 | 3.24 | 52% | 4.60 g. |

EXAMPLE 9–11

Bis[Tricarbonyl($\eta$-Cyclopentadienyl)Tungsten] as Catalytic Chain Transfer Agent in Free Radical Polymerization of Methyl Methacrylate 10.72 mL (0.1 mole) of methyl methacrylate were polymerized according to a method similar to that described in Example 1, except the amounts of bis[tricarbonyl($\eta$-cyclopentadienyl)tungsten] which in Table IV were used as the catalytic chain transfer agent. The results are shown in Table IV.

TABLE IV

| Ex. | [(C$_5$H$_5$W(CO)$_3$)$_2$] | Mn | Mw | Mw/Mn |
|---|---|---|---|---|
| 9 | 4.0 × 10$^{-5}$ M | 9040 | 17100 | 1.89 |
| 10 | 2.0 × 10$^{-4}$ M | 5300 | 9890 | 1.87 |
| 11 | 1.0 × 10$^{-3}$ M | 4700 | 8290 | 1.76 |

EXAMPLES 12–14 AND COMPARATIVE EXPERIMENT B

Bis[Tricarbonyl($\eta$-Cyclopentadienyl)Chromium] as Catalytic Chain Transfer Agent in Free Radical Polymerization of Styrene 23.0 mL (0.2 mole) of styrene were polymerized according to a method similar to that described in Example 1, except the amounts of bis[tricarbonyl($\eta$-cyclopentadienyl)chromium] shown in Table V were used as the catalytic transfer agent and the reflux time was 21 hours. The results are shown in Table V.

TABLE V

| Ex. | Comp. Exp. | [C$_5$H$_5$Cr(CO)$_3$)$_2$] | Mn | Mw | Mw/Mn | Peak MW |
|---|---|---|---|---|---|---|
| | B | 0 | 16,200 | 36,100 | 2.23 | 24,000 |
| 12 | | 5.0 × 10$^{-6}$ M | 16,900 | 37,600 | 2.22 | 20,000 |
| 13 | | 5.0 × 10$^{-5}$ M | 5,750 | 32,100 | 5.58 | 6,800 |
| 14 | | 2.5 × 10$^{-4}$ M | 2,030 | 6,540 | 3.22 | — |

EXAMPLES 15–17 AND COMPARATIVE EXPERIMENT C

Bis[Tricarbonyl($\eta$-Cyclopentadienyl)Chromium] as Catalytic Chain Transfer Agent in Free Radical Polymerization of Methyl Acrylate 9.0 mL (0.1 mole) of methyl acrylate were polymerized according to a method similar to that described in Example 1, except the amounts of bis[tricarbonyl($\eta$-cyclopentadienyl)chromium] shown in Table VI were used as the catalytic transfer agent. The results are shown in Table VI.

TABLE VI

| Ex | Comp. Exp. | [C$_5$H$_5$Cr(CO)$_3$)$_2$] | Mn | Mw | Mw/Mn | Peak MW |
|---|---|---|---|---|---|---|
| | C | 0 | 3,180 | 12,100 | 3.81 | 7,700 |
| 15 | | 5.0 × 10$^{-6}$ M | 3,670 | 12,200 | 3.32 | 8,200 |
| 16 | | 5.0 × 10$^{-5}$ M | 4,170 | 12,200 | 2.93 | 8,300 |
| 17 | | 2.5 × 10$^{-4}$ M | 335 | 1,640 | 4.90 | 500 |

EXAMPLES 18–20

Bis[Dicarbonyl($\eta$-Cyclopentadienyl)Ruthenium] as Catalytic Chain Transfer Agent in Free Radical Polymerization of Methyl Methacrylate 10.72 mL (0.1 mole) of methyl methacrylate were polymerized according to a method similar to that described in Example 1, except that the amounts of bis[dicarbonyl($\eta$-cylopentadienyl)ruthenium] shown in Table VII were used as the catalytic chain transfer agent. The results are shown in Table VII.

TABLE VII

| Ex. | [C$_5$H$_5$Ru(CO)$_2$)$_2$] | Mn | Mw | Mw/Mn | Peak MW |
|---|---|---|---|---|---|
| 18 | 4.0 × 10$^{-5}$ M | 8,040 | 15,800 | 1.97 | 14,000 |
| 19 | 2.0 × 10$^{-4}$ M | 6,850 | 13,100 | 1.91 | 11,000 |

TABLE VII-continued

| Ex. | [C₅H₅Ru(CO)₂)₂] | Mn | Mw | Mw/Mn | Peak MW |
|---|---|---|---|---|---|
| 20 | $1.0 \times 10^{-3}$ M | 5,730 | 10,700 | 1.87 | 8,600 |

EXAMPLES 21-23

Bis[Dicarbonyl($\eta$-Pentamethylcyclopentadienyl)Iron] as Catalytic Chain Transfer Agent in Free Radical Polymerization of Methyl Methacrylate 10.72 mL (0.1 mole) of methyl methacrylate were polymerized according to a method similar to that described in Example 1, except the amounts of bis[dicarbonyl($\eta$-pentamethylcyclopentadienyl)iron] shown in Table VIII was used as catalytic chain transfer agent. The results are shown in Table VIII.

TABLE VIII

| Ex. | [C₅(CH₃)₅Fe(CO)₂)₂] | Mn | Mw | Mw/Mn | Peak MW |
|---|---|---|---|---|---|
| 21 | $4.0 \times 10^{-5}$ M | 6,480 | 13,900 | 2.15 | 9,500 |
| 22 | $2.0 \times 10^{-4}$ M | 3,840 | 7,580 | 1.97 | 6,000 |
| 23 | $1.0 \times 10^{-3}$ M | 3,330 | 6,910 | 2.08 | 5,700 |

EXAMPLE 24

Bis[Dicarbonyl($\eta$-Pentamethylcyclopentadienyl)Osmium] as Catalytic Chain Transfer Agent in Free Radical Polymerization of Methyl Methacrylate 10.72 mL (0.1 mole) of methyl methacrylate were polymerized according to a method similar to that described in Exammple 1, except bis[dicarbonyl($\eta$-pentamethylcyclopentadienyl)osmium] at a concentration of $2.0 \times 10^{-4}$ molar was used as the catalytic chain transfer agent. The resulting polymer had a Mn of 7,310; a Mw of 15,300; a Mw/Mn of 2.09; and a peak MW of 13,000.

EXAMPLES 25-27

Tricarbonyl-$\eta$-cyclopentadienyl(Tricarbonyl-$\eta$-cyclopentadienylchromio)Molybdenum as Catalytic Chain Transfer Agent in Free Radical Polymerization of Methyl Methacrylate 10.72 mL (0.1 mole) of methyl methacrylate were polymerized according to a method similar to that described in Example 1, except the amount of tricarbonyl-$\eta$-cyclopentadienyl(tricarbonyl-$\eta$-cylcopentadienylchromio)molybdenum in Table IX was used as catalytic chain transfer agent. The results are shown in Table IX.

TABLE IX

| Ex. | [C₅H₅(CO)₃Cr—Mo(CO)₃C₅H₅] | Mn | Mw | Mw/Mn | Peak MW |
|---|---|---|---|---|---|
| 25 | $4.0 \times 10^{-5}$ M | 7,510 | 20,100 | 2.68 | 22,000 |
| 26 | $2.0 \times 10^{-4}$ M | 276 | 572 | 2.07 | — |
| 27 | $1.0 \times 10^{-3}$ M | 133 | 233 | 1.75 | — |

EXAMPLES 28-30

Bis[Dicarbonyltriphenylphosphine($\eta$-Cyclopentadienyl)Chromium] as Catalytic Chain Transfer Agent in Free Radical Polymerization of Methyl Methacrylate 10.72 mL (0.1 mole) of methyl methacrylate were polymerized according to a method similar to that described in Example 1, except the amount of bis[dicarbonyl]triphenylphosphine($\eta$-cyclopentadienyl)chromium] shown in Table X was used as the catalytic chain transfer agent. The results are shown in table X.

TABLE X

| Ex. | [(C₅H₅(CO)₂P—(C₆H₅)₃Cr)₂] | Mn | Mw | Mw/Mn | Peak MW |
|---|---|---|---|---|---|
| 28 | $4.0 \times 10^{-5}$ M | 8,900 | 18,300 | 2.06 | 11,000 |
| 29 | $2.0 \times 10^{-4}$ M | 771 | 2,220 | 2.85 | 2,300 |
| 30 | $1.0 \times 10^{-3}$ M | 150 | 210 | 1.40 | — |

Industrial Applicability

Macromonomers prepared by the present method can be polymerized or copolymerized to produce graft polymers which are useful in coating and molding resins. Other potential uses include cast, blown, spun or sprayed applications in fiber, film, sheet, composite materials, multilayer coatings, photopolymerizable materials, photoresists, surface active agents including soil repellants and phsiological surfaces, adhesives, adhesion promoters and coupling agents. End products taking advantage of available characteristics include laquers, enamels, electrocoat finishes, high solid finishes, aqueous or solvent based finishes, clear or filled acrylic sheet or castings, including automotive and architectural glazing and illumination housings and refractors, additives for oil and fuel, including antimisting agents, outdoor and indoor graphics including signs billboards and traffic control devices, reprographic products and others.

What is claimed is:

1. A process for free radical polymerization of unsaturated monomer wherein molecular weight control is effected by means of a chain transfer agent, comprising:
   contacting one unsaturated monomer selected from the group consisting of monomers having the formulae $$CH_2=\overset{\underset{\displaystyle CH_3}{|}}{C}-X,\ CH_2=CH-Y\ \text{and}\ C_6H_5CH=CH_2,$$

wherein
X is COOR or CN,
Y is COOR or CN, and
R is at least one moiety selected from the group consisting of C₆H₅, alkyl, glycidal, hydroxyalkyl, allyloxyethl, 2,4-hexadienyl, dialkyl aminoalkyl, and $C_zH_{2z+1}$ where z is an integer from 1 to 12, inclusive,
with a catalytically effective amount of a free radical initiator in the presence of a bimetallic catalytic chain transfer agent; said bimetallic catalytic chain transfer agent having the formula $$A(L)_xM\text{-}M(L)_xA$$

wherein, for each occurrence,
A is an unsubstituted cyclopentadienyl anion or a cyclopentadienyl anion substituted with at least one substituent selected from the group consisting of C₆H₅, $C_yH_{2y+1}$, SiR₃, PR₂, and CO₂R;
L is CO, (C₆H₅)₃P, (C₆H₅O)₃P, R₃P, (RO)₃P;
M is Cr, Mo, W, Fe, Ru, Os;
R is $C_yH_{2y+1}$;
x is 3 when M is Cr, Mo, or W, and 2 when M is Fe, Ru or Os; and
y is an integer from 1 to 12, inclusive;

said free radical, initiator being capable of initiating polymerization of said monomers in the absence of said bimetallic catalytic chain transfer agent.

2. A process as defined in claim 1, wherein the bimetallic catalytic chain transfer agent is present in a concentration of from about $1.0 \times 10^{-7}$ to about $1.0 \times 10^{-2}$ M.

3. A process as defined in claim 2, wherein the bimetallic catalytic chain transfer agent is present in a concentration of from about $2.0 \times 10^{-6}$ to about $1.0 \times 10^{-3}$ M.

4. A process as defined in claim 1, wherein A is an unsubstituted cyclopentadienyl anion.

5. A process as defined in claim 4, wherein L is CO.

6. A process as defined in claim 5, wherein M is Cr.

7. A process as defined in claim 6, wherein the bimetallic catalytic chain transfer agent/initiator molar ratio is in the range of from about 0.004 to about 2.

8. A process as defined in claim 7, wherein the process is conducted in the absence of molecular oxygen.

9. A process as defined in claim 6, wherein the unsaturated monomer is selected from the group consisting of monomers having the formulae:

$$CH_2=\overset{\overset{\displaystyle CH_3}{|}}{C}-X, \quad CH_2=CH-Y \text{ and } C_6H_5CH=CH_2,$$

wherein
X is COOR
Y is COOR and
R is methyl.

10. A process as defined in claim 9, wherein the unsaturated monomer is methyl methacrylate.

11. A process as defined in claim 10, wherein the bimetallic catalytic chain transfer agent/initiator molar ratio is in the range of from about 0.004 to about 2.

12. A process as defined in claim 11, wherein the process is conducted in the absence of molecular oxygen.

* * * * *